Dec. 25, 1962  J. DOMEK  3,070,675
INERTIAL SWITCH FOR AUTOMOBILES
Filed Dec. 7, 1961

INVENTOR.
JOHN DOMEK
BY
Lloyd J. Andrews

United States Patent Office 3,070,675
Patented Dec. 25, 1962

3,070,675
INERTIAL SWITCH FOR AUTOMOBILES
John Domek, 11401 SW. 87th Ave., Miami, Fla.
Filed Dec. 7, 1961, Ser. No. 157,676
3 Claims. (Cl. 200—61.45)

This invention relates in general to electric inertial switches and more particularly to a switch means for interrupting the ignition circuit in an automobile or other vehicle and stopping the engine therein when the vehicle is subjected to abnormal shock.

Serious automobile accidents often resulting in casualties can be minimized by automatically interrupting the ignition circuit and stopping the engine of the vehicle upon a first abnormal shock, thus, preventing the serious consequences resulting from a vehicle operating out of control. The same switch means also minimizes the danger of fire resulting from fuel ignition by the ignition system when a vehicle is overturned.

Prior inertial switches for vehicles are not generally acceptable because when constructed with sufficient sensitivity to be effective they would render the engine inoperative when the vehicle encounters rough road or other normal shock and when made sufficiently insensitive to overcome this difficulty they are not sufficiently sensitive to operate upon the reaction from certain out of control shocks such as the overrunning of a cub.

Prior devices also fail to attain general acceptance due to the lack of convenient means for quickly restoring the switch to normal following a shock operation.

The present invention overcomes the above objections and disadvantages by the provision of a sensitive inertial switch including an effective and convenient resetting means whereby the operator of the vehicle can simply and quickly restore the normal operation of the ignition system in the event the switch is operated by shock from unusual road conditions which construction is a principal object of the invention.

A further object of the invention is the provision of an inertial switch simple to install in a vehicle and sensitive to shock applied in any lateral direction.

Another object of the invention comprehends construction of a safety switch in which a tiltable active member is normally supported in substantially vertical position by a detent means and in which position said member completes a normal ignition circuit.

Another object of the invention is the provision of an inertial switch including a vertical movable restoration member connected by a remote control restoring means for manually centering and restoring a shock displaced switch member.

These and other objects and advantages in one embodiment of the invention are described and shown in the following specification and drawing in which.

Figure 1:
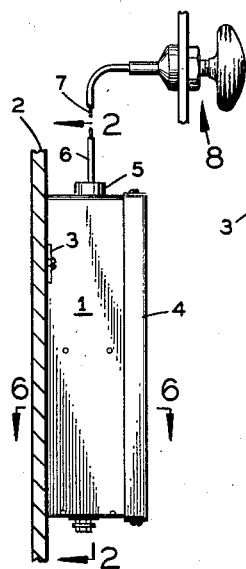
FIG. 1 is an illustration of the inertial switch secured to a vertical part of a vehicle with a manual remote restore means connected thereto.

Referring to FIG. 1, a casing 1 is adapted to be secured to a vertical part 2 of a vehicle such as the inside surface of the fire wall in an automobile by means of brackets 3—3 and screws therethrough, as shown. A removable cover 4 encloses the working parts of the switch. A bushing 5 fixed in the top side of casing 1 retains a flexible cable consisting of a coil casing 6 and a central wire 7 terminating at its outer end in a manual control means 8 which is adapted to reciprocate wire 7 and positioned convenient to the operator of the vehicle.

Figure 2:
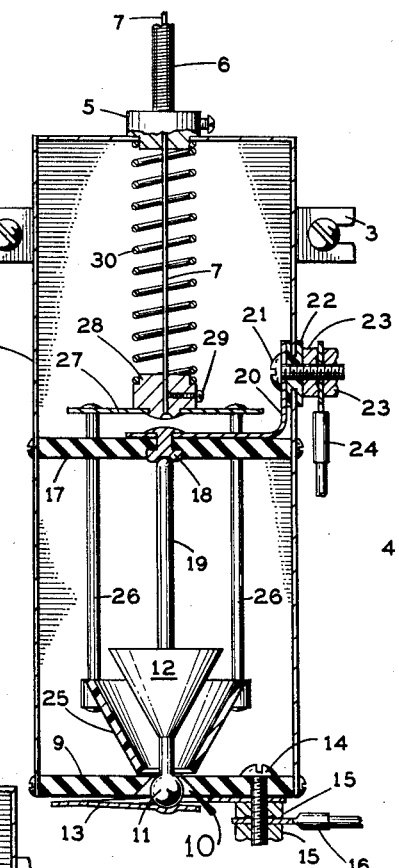
FIG. 2 is an enlarged cross sectional front elevation taken through section line 2—2, FIG. 1.

Referring to FIG. 2, a plate 9, made of dielectric material, is secured in the lower end of casing 1, as shown, and provided with a conical socket 10 for retaining a spherical lower end or ball 11 of a conducting shaft 19 on which is fixed a conical weight or inertial member 12.

Figures 5, 6:
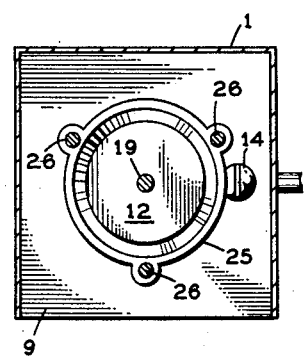
FIG. 5 is an enlarged bottom view of the switch, shown FIG. 1.
FIG. 6 is an enlarged cross sectional plan view taken through section line 6—6, FIG. 1.

A flat spring 13, better shown FIG. 5, loosely retains the ball 11 in the conical socket 10 by means of screw 14 and nut 15. The screw 14 and an additional nut 15 provide means for securing a wire terminal 16 for one conductor in an ignition circuit, not shown.

A second plate 17, made from dielectric material, is secured in frame 1 in parallel spaced relation to plate 9, as shown, and centrally retains an electric contact 18 secured therein. A central spherical concave depression in the contact normally retains the upper spherical end of shaft 19 under the tension of spring 13, as shown in FIG. 2. The contact 18 has secured thereto a conducting bracket 20 terminating under a screw 21 insulated by bushing 22 from casing 1 and retained by nut 23. Another nut 23 on screw 21 serves to hold a wire terminal 24 connected in the ignition circuit, not shown.

A conical restore collar 25, made from dielectric material, is normally urged into the position shown in FIG. 2 by three parallel rods 26 secured therein and slidably retained for axial vertical movement in plate 17. The upper ends of rods 26 are secured in a plate 27 having a central bushing 28 therein for retaining the wire 7 by means of screw 29. A spring 30 positioned between bushings 5 and 28 is normally under compression and serves to urge the wire 7 in its idle retracted position and the restore collar 25 in its lowermost position.

In operation, the terminals 16 and 24 are connected in series with the ignition circuit of an engine, preferably in the primary conductor of a spark coil.

Figure 3:
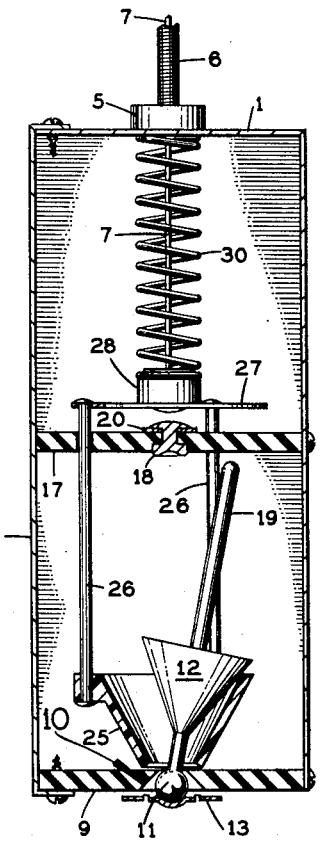
FIG. 3 is an enlarged cross sectional side elevation of the switch, shown FIG. 1, with the elements therein in open circuit position.
Figure 4:
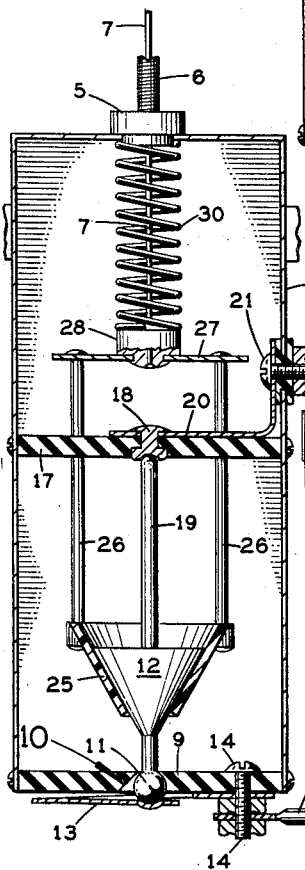
FIG. 4 is the same as FIG. 2 with elements in changed position.

Referring to FIG. 2 and assuming that the shaft 19 is in detent engagement with contact 18, by virtue of spring 13, it is apparent that a normal ignition circuit is established. When the vehicle is subjected to shock of predetermined magnitude from any lateral direction, the inertia of the mass of member 12 will overcome the detent engagement of the shaft 19 with contact 18 and tilt the shaft into any lateral position such as illustrated in FIG. 3 which movement will interrupt the circuit normally closed by terminals 16 and 24 and, thus, cause the engine to cease operating.

It is also apparent that when the knob of the manual control means, shown FIG. 1, is pulled against the restraining action of spring 30, the plate 27 will raise the restore collar 25 and guide and reset the shaft 19 into detent engagement with contact 18 and, thus, re-establish the ignition circuit.

It is to be noted that there is intended to be sufficient clearance between the socket 10 and the ball 11 whereby the shock sensitivity of the switch may be adjusted by increasing or decreasing the tension of spring 13 against the ball 11 in order to provide for an optimum detent resistance against displacement of the shaft 19 from minor lateral road shocks which are usually limited to vertical forces with small lateral components.

It is understood that certain modifications in the above, utilizing the features described, are intended to come within the scope of the appended claims.

Having described my invention, I claim:
1. An inertial switch for an ignition circuit comprising means forming a frame adapted for mounting in a vehicle,
an elongated inertial member of electric conducting material including a coaxial circular weight thereon,
a socket means in said frame adapted and constructed to retain the lower end of said member for tilting movement from a substantially vertical normal position through a predetermined angle to a tilted position in any direction lateral to said vertical position,
a contact means secured in and insulated from said frame having a cavity therein for detent and electric engagement with the upper end of said member when the latter is moved from said tilted to said normal position,
a spring means secured to said frame in frictional and electric engagement with the lower end of said member positioned to vertically urge the latter into detent engagement with said contact means for completing a switching circiut from the latter through said member,
a restore collar means slidably retained in said frame for predetermined vertical movement from an idle to a restore position when operated,
said collar means positioned for engaging the outer periphery of said weight and moving said member from said tilted to said vertical position when said collar means is operated whereby said weight will displace said member from said detent engagement with said contact means and open said circuit when said casing is subjected to a lateral shock of predetermined force and whereby said collar means will restore said member from said tilted to said normal position when operated.

2. An inertial switch for an ignition circuit in a vehicle comprising means forming a frame,
an elongated switch member pivoted at the lower end thereof in said frame for movement from a substantially vertical normal position through a predetermined angle to a tilted position in any direction lateral to said vertical position,
a weight means coaxially fixed on said member having a conical upward divergent outer surface,
a contact means secured in and insulated from said frame having a cavity therein for detent and electric engagement with the upper end of said member when the latter is moved from said tilted to said normal position,
a spring means secured to said frame in frictional and electric engagement with the lower end of said member positioned to vertically urge the latter into detent engagement with said contact means for completing a switching circuit from the latter through said member,
a restore collar means slidably retained in said frame for predetermined axial vertical movement from an idle to a restore position when operated,
said collar means having a conical upward divergent inner surface equi-spaced from said weight means when in said idle position,
manual remote control means secured to said frame and said collar means for moving the latter from said idle position to said restore position whereby the said conical surface of said collar will engage the said surface of said weight means and move said member into said normal position when the latter is tilted and said control means is operated for completing said circuit.

3. The construction recited in claim 2 including a pair of electric terminals connected to said contact means and said spring means respectively for connection in series with an ignition circuit for completing same when said member is in said normal position.

References Cited in the file of this patent

UNITED STATES PATENTS

| 2,236,872 | Grigsby | Apr. 1, 1941 |
| 2,783,321 | Richardson | Feb. 26, 1957 |
| 2,826,655 | Wurm | Mar. 11, 1958 |
| 2,879,349 | Thompson | Mar. 24, 1959 |
| 3,022,392 | Clemson | Feb. 20, 1962 |

FOREIGN PATENTS

| 385,897 | Great Britain | Jan. 5, 1933 |